UNITED STATES PATENT OFFICE.

BERNHARD PRIEBS AND OSKAR KALTWASSER, OF BERLIN, GERMANY, ASSIGNORS TO THE ACTIEN-GESELLSCHAFT FÜR ANILIN FABRIKATION, OF SAME PLACE.

BLUE SULFUR DYE.

SPECIFICATION forming part of Letters Patent No. 642,256, dated January 30, 1900.

Application filed August 18, 1899. Serial No. 727,698. (Specimens.)

*To all whom it may concern:*

Be it known that we, BERNHARD PRIEBS and OSKAR KALTWASSER, of Berlin, in the Kingdom of Prussia, German Empire, have invented new and useful Improvements in the Production of Indigo-Blue Dyes; and we do hereby declare that the following is a full, clear, and exact description of the invention, which will enable others skilled in the art to which it appertains to make and use the same.

It has been shown that by melting with sulfur and sulfids of alkali metals certain nitrooxy derivatives of diphenylamin—such as dinitrooxydiphenylamin, dinitrooxydiphenylamin-sulfonic acid, and dinitrooxydiphenylamin-carbonic acid—having the following formulæ:

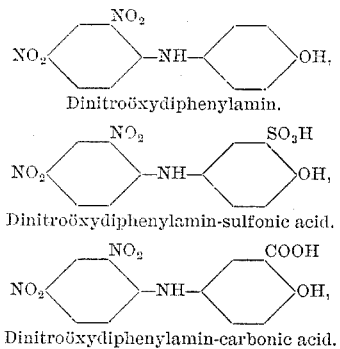

there are obtained sulfur dyes which directly produce on the fiber black tints without requiring a subsequent oxidation.

Now we have discovered that by treating the melts obtained from the raw materials above mentioned with hot alcohol, removing afterward the alcohol by filtration, and drying the residue there result products which essentially differ from the dyestuffs directly obtained, not only by their tinctorial properties, but also by their whole chemical and physical character. It is therefore evident that by the treatment with hot alcohol a chemical reaction is produced which leads to the formation of new dyestuffs totally different from the coloring-matters which we use as starting products. The products obtained by such treatment with alcohol dye much clearer and more indigo-blue shades than the raw materials from which they are prepared. At the same time these new products dissolve in water with purer and more violet coloration. While the directly-obtained products of the reaction of sulfur and alkali sulfids with the derivatives of oxydinitrodiphenylamin when mixed with ordinary sulfuric acid remain at first nearly undissolved and only yield after standing for some time solutions of dirty-gray-green or gray-blue color, the dyestuffs obtained by treating the aforesaid products with alcohol dissolve easily in cold concentrated sulfuric acid with a fine violet-blue coloration.

The following directions will explain in what manner we proceed in order to carry out our invention:

One part, by weight, of the melt obtained directly from dinitrooxydiphenylamin by means of sulfur and alkali sulfids is heated with ten parts of ethyl alcohol during several hours in a vessel connected with a reflux condenser. The alcohol is then filtered off, the residue is dried, preferably in the open air, and can in this state be directly used for dyeing. It dyes unmordanted cotton indigo-blue shades. The product obtained in this way forms in dry state a black-brown powder which readily dissolves in water with pure violet-blue color, which on addition of caustic-soda lye is not changed, an excess of caustic-soda lye producing a blue-black precipitate. By the addition of mineral acids to the aqueous solution of the dye a red-violet precipitate is formed. In concentrated sulfuric acid the dye dissolves with fine violet-blue color. The dye is practically insoluble in alcohol.

Instead of the product obtained from dinitrooxydiphenylamin we may use with a similar result the nitrooxydiphenylamin derivatives obtained by heating with sulfur and alkali sulfids dinitrooxydiphenylamin-sulfonic acid or dinitrooxydiphenylamin-carbonic acid.

Having now described our invention and in what manner the same can be performed, what we claim as new is—

The blue dye which results by treating the sulfur dyes derived by means of sulfur and alkali sulfids from the herein-described dinitrooxydiphenylamin derivatives, with hot alcohol, removing afterward the alcohol by filtration and drying the residue—said dye forming in dry state a black-brown powder, readily dissolving in water with fine violet-blue color, which is not changed on addition of caustic-soda lye, an excess of caustic-soda lye producing a blue-black precipitate, an aqueous solution of the dye yielding on the addition of mineral acids a red-violet precipitate, said dye being readily soluble in concentrated sulfuric acid with fine violet-blue color, practically insoluble in alcohol, and producing on unmordanted cotton in an alkaline bath indigo-blue shades of great intensity and fastness.

In witness whereof we have hereunto signed our names, this 4th day of August, 1899, in the presence of two subscribing witnesses.

BERNHARD PRIEBS.
OSKAR KALTWASSER.

Witnesses:
  WOLDEMAR HAUPT,
  HENRY HASPER.